United States Patent
Hoddinott

[11] 3,837,261
[45] Sept. 24, 1974

[54] MILLING MACHINE KNEE CLAMP
[75] Inventor: William M. Hoddinott, Milford, Conn.
[73] Assignee: Textron Inc., Providence, R.I.
[22] Filed: Mar. 29, 1973
[21] Appl. No.: 346,135

[52] U.S. Cl. .................................. 90/58 A, 29/1 A
[51] Int. Cl. ............................ B23c 9/00, B23q 1/26
[58] Field of Search ....................... 90/58 A; 29/1 A

[56] References Cited
UNITED STATES PATENTS
1,972,828  9/1934  Nenninger ............................ 29/1 A
2,908,204  10/1959  Riedel ................................. 90/58 A Primary Examiner—Francis S. Husar
Attorney, Agent, or Firm—Arthur A. Johnson

[57] ABSTRACT

There is disclosed clamps for taking up any clearance between the dovetail on the column of a milling machine and the companion ways in the knee and lock the knee to the column against all swaying movement. This is accomplished by having vertically spaced clamping portions on the side of the knee, each clamping portion containing a part of the ways, which ride in the dovetail on the column, separated from adjacent portions of the knee and providing a screw which, when operative, will spring said clamping portion inwardly to clamp portions of the ways on both sides of the knee against both sides of the column dovetail.

2 Claims, 4 Drawing Figures

MILLING MACHINE KNEE CLAMP

This invention relates to milling machines and more particularly to means for clamping the knee of the machine to the column thereof.

It is customary to provide the column of the machine with vertically extending dovetail ways and to provide the sides of the knee with companion ways to guide the knee's up and down movements on the column upon operation of an elevating screw between the base of the column and the center of the knee. The fit between the dovetail on the column and the ways on the knee is such that the knee may slide freely on the column, the knee being supported on the centrally located elevating screw. Even though the clearance between the dovetail and the ways is slight, the knee may on occasion wobble somewhat on the elevating screw, and if this movement is excessive, faulty or damaged work can result. This problem is greatly aggravated when the milling machine is being operated automatically as from a programmed tape for instance, since the machine is not closely monitored and the resulting wobbling may go unnoticed until the workpiece is examined and even then the cause of the defect may not be apparent.

Efforts to hold the knee steady on the column have been made but the clamping means used were mere tension brakes and did not lock the knee completely.

To obviate these difficulties the present invention provides means for securely and reliably clamping the knee to the column after it has been adjusted to the desired operating position on the column.

In the form of the invention herein illustrated and described the knee is securely clamped to the dovetail of the column by springing integral parts on the way-carrying portion of the knee against one side of the dovetail while at the same time forcing the way on the opposite side of the knee against its companion side of the dovetail.

Preferably there are two clamping means—one near the top of the side of the knee and one near the bottom thereof, thus preventing movement of the knee in a front and back direction, as well as in a side to side direction. Each clamping means has a rod having one end fixed to one side of the knee and extending to the other side of the knee where it is provided with a screw thread engaging a threaded hub on a manually operable handle.

Other features and advantages will hereinafter appear.

Figure 1:
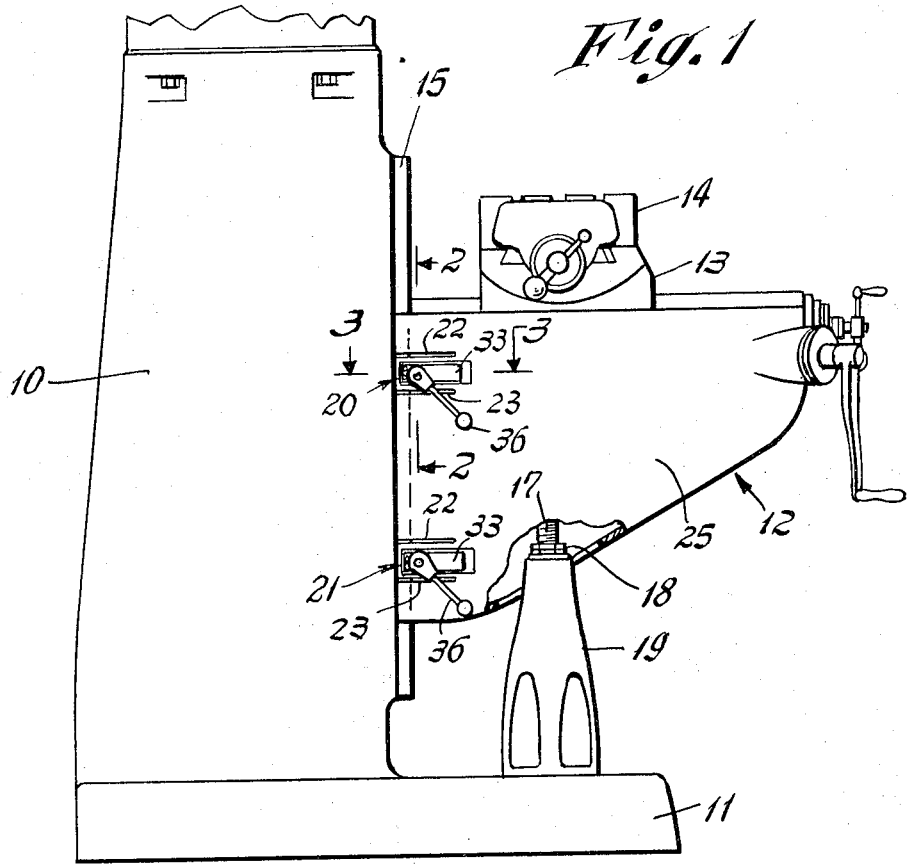
FIG. 1 is a side elevation of the knee of a milling machine and a portion of the column on which it is mounted and showing the exposed parts of the clamping means of this invention.

As shown in FIG. 1, the milling machine comprises a column 10 having a base 11 and a knee 12 for supporting a saddle 13 having a table 14 on which work may be supported. The column 10 has a vertical dovetail 15 having ways which receive companion ways 16 on the knee 12.

The knee 12 is moved vertically under control of an elevating screw 17 threaded in a nut 18 mounted on an elevating screw housing 19.

A close fit is required between the bearing surfaces 15a on the dovetail 15 and the knee ways 16 so that the work supported on the table 14 may be performed accurately at all times. However, sufficient clearance must be provided to allow the raising and lowering of the knee and the work support thereby. But this clearance also permits the knee to wobble on the elevating screw 17 and can result in faulty work being performed on the machine.

To avoid the rocking and wobbling of the knee on the column, it has been proposed to manually apply pressure to a knee locking plunger when the knee has been properly positioned. But such a device was merely a tension brake and did not lock the knee completely.

According to the present invention the knee may be reliably locked by the operator to the column against all movement relative to the column.

In the form of this invention herein described and illustrated there are two spaced clamping members 20 and 21, each being an integral part of the knee 12 and being formed by providing parallel and horizontally spaced slots 22 and 23 in the casting forming the knee. The slots 22 and 23 are in the rear marginal edge portion 24 of the side panel 25 of the knee.

Figure 2:
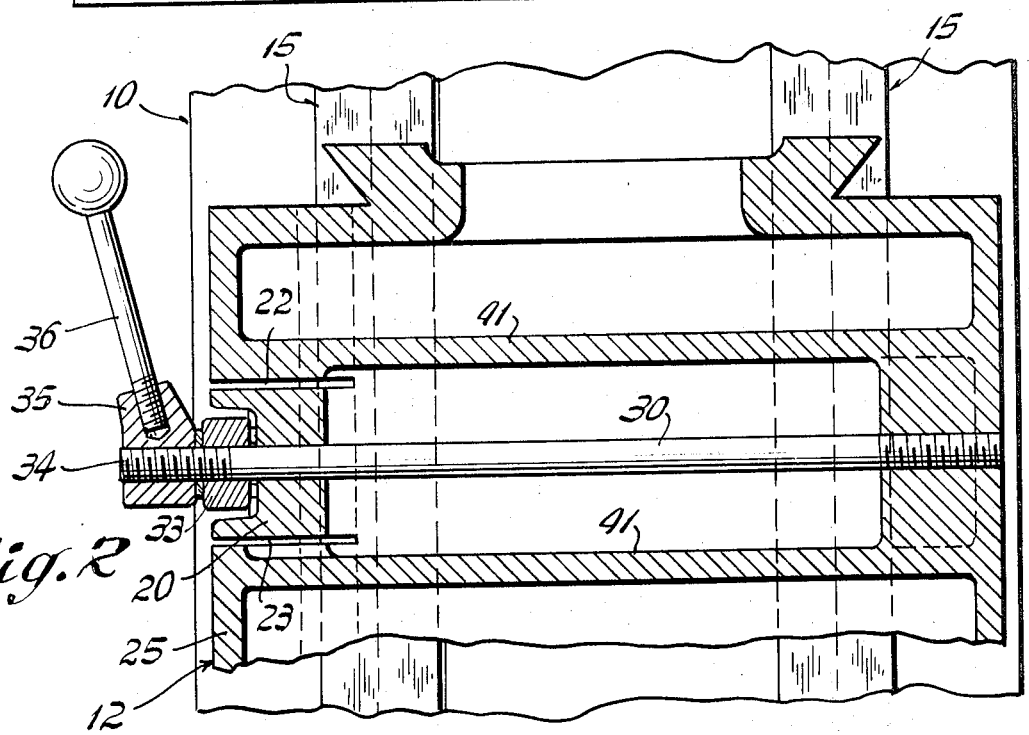
FIG. 2 is a vertical section taken on line 2—2 of FIG. 1, of a portion of the knee and the ways of the saddle which is mounted on the knee.
Figure 3:
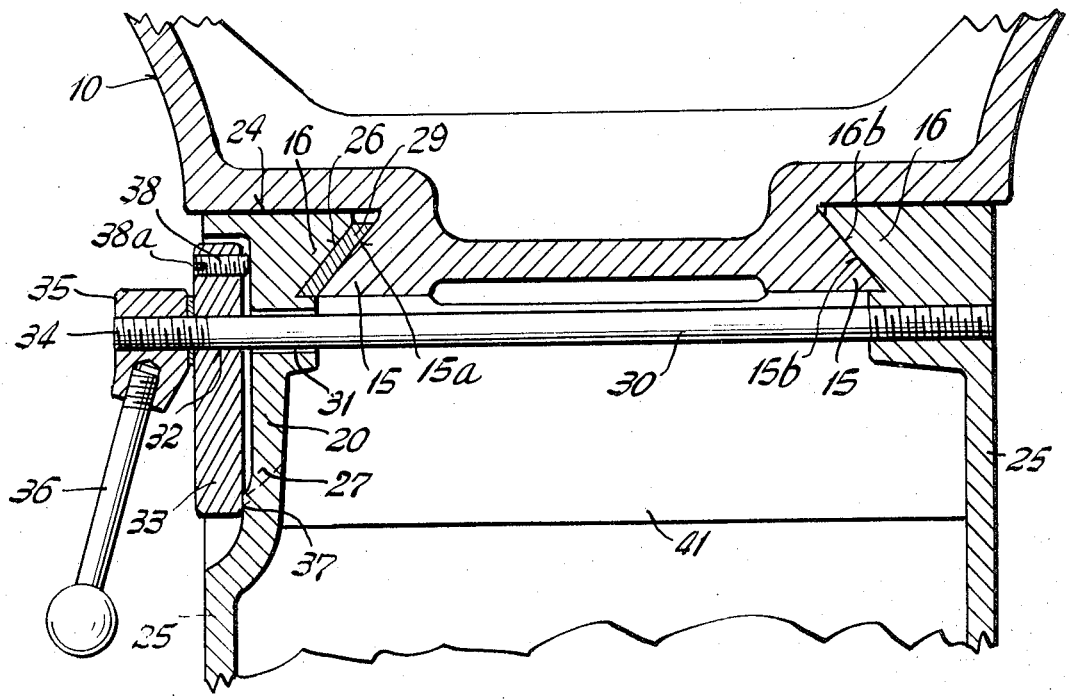
FIG. 3 is a horizontal section taken on the line 3—3 of FIG. 1.
Figure 4:
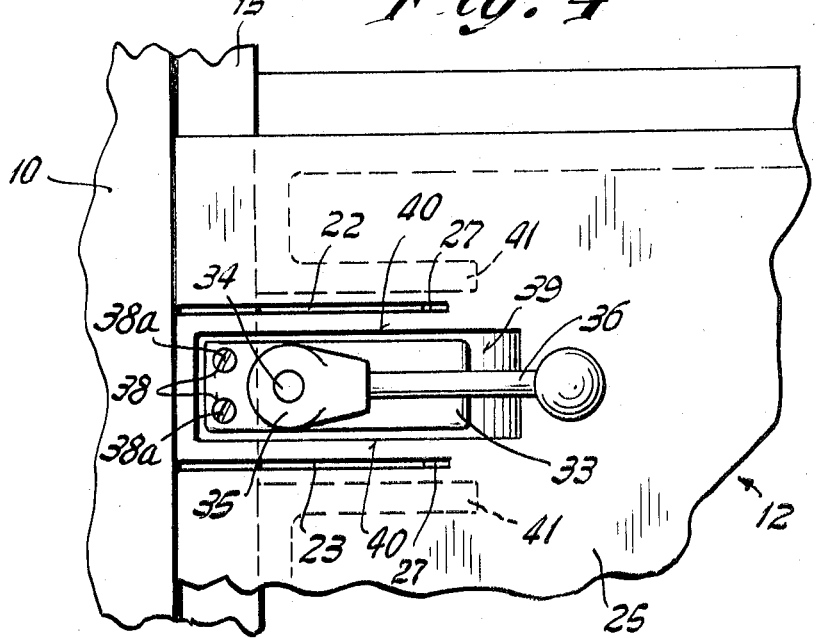
FIG. 4 is side view of the upper outside portion of the knee showing the clamping member of the present invention.

As shown in FIG. 2, the slots 22 and 23 extend inwardly of the knee sufficiently to include the parts of the knee containing the way surfaces 26. The slots 22 and 23 are extended inwardly a sufficient distance to provide a bending point 27 adjacent the ends of the slots which acts as a sort of fulcrum against which the clamping members 20 may be sprung inwardly to force the clamping surfaces 26 against the gib 29 and the latter against the ways 15a of the column dovetail 15.

The clamping members 20 and 21 are so formed that normal clearance is provided between the gib 29 and dovetail ways 15a, and between the dovetail ways 15b and the surface 16b of the ways 16 to allow vertical movement of the knee when necessary, for instance when setting up the machine for a particular operation.

To take up the clearance and lock the knee to the column, according to the present invention, each clamping member 20 and 21 has a rod 30 which is secured at one end to the panel 25 at the far side of the knee, the other end extending through an aperture 31 in the clamping member 20 and an aperture 32 in a block 33. The projecting end 34 is threaded and extends into a hub 35 of a clamping handle 36.

The block 33 is provided to carry the force of the handle 36 to the upper portion of the clamping member and for this purpose the block 33 at its lower end bears against a portion 37 of the knee just below the end of the slots 22 and 23 and at its upper portion lugs 38 which bear against the surface of the clamping member virtually in line with the center of the ways-carrying portion of the clamping member so that the thrust of the lugs 38 will be distributed equally to the surface of the contacting surfaces and thus more effectively lock the knee to the column.

When the handle 36 is operated, the thrust applied to the rod 30, in addition to forcing the surface 26 on the clamping member 20 against the gib 29 and the latter against the surfaces 15a of the dovetail 15, pulls the surface 16b on the knee against the surface 15b of the dovetail with the result that all clearance is taken up and both sides of the knee are locked to the dovetail 15.

In order to be able to position the handle in an out-of-the-way position after the knee is locked up, the lugs 38 are screw threaded in the block and have slots 38a so that they can be advanced or backed off to engage the block when the handle is in a place from which it may move to a satisfactory position in locking up the knee.

The clamping members 20 and 21 may have a recess 39 in which the block 33 is located. The sides 40 of the recess would limit the rotary movement of the block.

The knee may be cast with reinforcing ribs 41 adjacent and parallel with the slots.

Variations and modifications may be made within the scope of the claims and portions of the improvements may be used without others.

I claim:

1. In a milling machine having a column having vertical dovetail ways, a vertically adjustable knee having knee ways to engage with sliding clearance and be guided by said dovetail ways for vertical movement on said column, said knee having an integral clamping portion including a knee way carrying portion which is resiliently movable on the knee, and means for forcing said integral clamping portion of the knee against one of said dovetail ways to take up said clearance between said dovetail ways and said knee ways and clamp the knee in adjusted position on the column, said means for forcing said integral clamping portion of the knee against said dovetail ways comprising a rod fixed to the knee and extending through an aperture in said integral clamping portion and having on one end screw threads and a nut member on said screw threads adapted to apply force to said integral clamping portion when said nut is operated, said nut having an operating handle secured thereto, and a block supported on said rod and interposed between said integral clamping portion and said nut, said block having one end bearing on a part of the knee adjacent the bottom of the integral clamping portion and an upper portion positioned to engage and apply force to an upper part of the clamping portion.

2. A milling machine as defined in claim 1 in which there are adjustable screw means on the top part of said block to engage the upper portion of the integral clamping portion for the purpose described.

* * * * *